United States Patent
Chen

(10) Patent No.: US 7,962,605 B2
(45) Date of Patent: Jun. 14, 2011

(54) DISTRIBUTED DEVICE DISCOVERY FRAMEWORK FOR A NETWORK

(75) Inventor: Weihai Chen, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1529 days.

(21) Appl. No.: 09/989,474

(22) Filed: Nov. 20, 2001

(65) Prior Publication Data

US 2003/0097425 A1      May 22, 2003

(51) Int. Cl.
*G06F 15/173* (2006.01)
*G06F 15/177* (2006.01)

(52) U.S. Cl. .................... 709/224; 709/220

(58) Field of Classification Search .......... 709/220, 709/223–224
See application file for complete search history.

(56) References Cited

U.S. PATENT DOCUMENTS

| | | | |
|---|---|---|---|
| 5,742,598 A | 4/1998 | Dunn et al. | |
| 6,058,423 A | 5/2000 | Factor | |
| 6,182,136 B1 | 1/2001 | Ramanathan et al. | 709/224 |
| 6,236,983 B1 * | 5/2001 | Hofmann et al. | 706/47 |
| 6,286,038 B1 | 9/2001 | Reichmeyer et al. | 709/220 |
| 6,311,219 B1 | 10/2001 | Factor | |
| 6,453,350 B1 | 9/2002 | Factor | |
| 6,636,499 B1 | 10/2003 | Dowling | 370/338 |
| 6,865,728 B1 | 3/2005 | Branson et al. | 717/108 |
| 6,920,506 B2 * | 7/2005 | Barnard et al. | 709/245 |
| 2002/0026527 A1 | 2/2002 | Das et al. | 709/245 |
| 2002/0161883 A1 | 10/2002 | Matheny et al. | 709/224 |
| 2002/0196451 A1 | 12/2002 | Schlonski et al. | 358/1.1 |
| 2003/0023892 A1 * | 1/2003 | Giovanni | 714/2 |
| 2003/0046427 A1 | 3/2003 | Goringe et al. | 709/242 |

OTHER PUBLICATIONS

Veizades et al., "Service Location Protocol," RFC 2165, Jun. 1997, 68 pgs.
Goland et al., "Simple Service Discovery Protocol/1.0 Operating without an Arbiter," *Internet Draft*, Apr. 2000, 18 pgs.
Fout, "Universal Plug and Play in Windows XP," *Microsoft TechNet*, Jul. 1, 2001, 22 pgs.
"SSDP," *SSDP protocol*, © 2005, 1 pg.

* cited by examiner

*Primary Examiner* — Kamal B Divecha
(74) *Attorney, Agent, or Firm* — Lee & Hayes, PLLC

(57) ABSTRACT

A method and system for discovering resources connected to a distributed network having a plurality of subnets is provided. Resource discovery over a distributed network is facilitated by active simple discover agents (ASDAs), that are selected from candidate simple discovery agents (SDAs) on the subnets. The ASDA discovers ASDAs on neighboring subnets. After determining neighboring ASDAs, an ASDA issues discovery search requests to the neighboring ASDAs. The neighboring ASDAs forward such requests onto their neighboring ASDAs to propagate a device discovery search request throughout a network comprising multiple subnets.

20 Claims, 13 Drawing Sheets

```
<SDA List>
  <SDA >
    <Subnet> 3.2.0.0 </Subnet>
    <IPAddress> 3.2.5.6 </IPAddress>
  </SDA >
  <SDA >
    <Subnet> 3.3.0.0 </Subnet>
    <IPAddress> 3.3.2.5 </IPAddress>
  </SDA >
  <SDA >
    <Subnet> 3.4.0.0 </Subnet>
    <IPAddress> 3.4.5.3 </IPAddress>
  </SDA >
</SDA List>
```

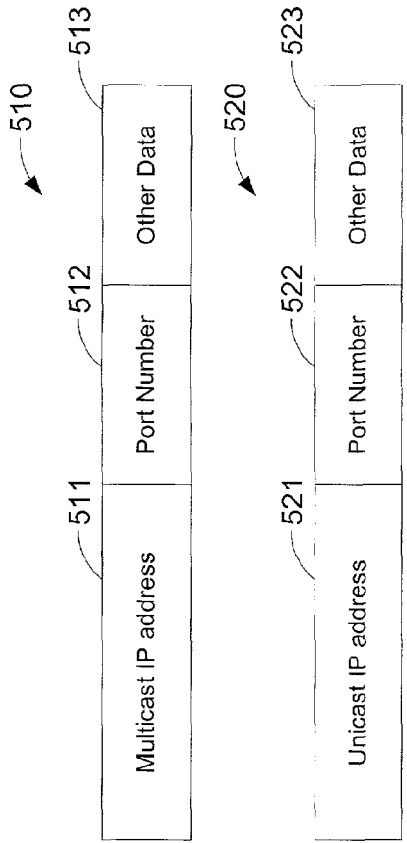

Message Types

| Message | Message Source | Message Destination | Message Type |
|---|---|---|---|
| WHO_IS_ASDA | Resource | Subnet having the resource | Multicast |
| ASDA_AD | ASDA | Adjacent subnets | Multicast |
| | ASDA | Subnet having the ASDA | Multicast |
| | Neighbor ASDA | Originating ASDA | Unicast |
| SDA_WILLING | SDA | Subnet | Multicast |
| SEARCH_DEVICE | Resource | ASDA | Unicast |
| | ASDA | Neighbor ASDA | Unicast |
| | Resource | Directory Service | Unicast |
| FOUND_DEVICE | ASDA | Resource | Unicast |
| | Directory Service | Resource | Unicast |

| Multicast IP address | Port Number | Other Data |
|---|---|---|

FIG. 5c

| Unicast IP address | Port Number | Other Data |
|---|---|---|

FIG. 5d

| Administrative Messages | |
|---|---|
| Name | Parameter |
| GET_VERSION REQ | (GUID, ReID) |
| GET_VERSION RESP | (GUID, ReID, INT Major, INT Minor) |
| HEARTBEAT REQ | (GUID, ReqID) |
| HEARTBEAT RESP | (GUID, ReqID) |
| SHUTDOWN REQ | (GUID, ReqID) |
| SHUTDOWN RESP | (GUID, ReqID) |

|     | Name | Parameters |
| --- | --- | --- |
| 572 | REGISTER NOTIFICATION REQ | (GUID, ReID, GUID NotificationID, BOOL bSecure, STRING SubnetScope) |
| 574 | REGISTER NOTIFICATION RESP | (GUID, ReID, INT Mode, ErrorEnum ErrorCode, STRING ErrorDescription) |
| 575 | PROGRESS REQ | (GUID, ReqID, INT ProgressPacentage) |
| 576 | PROGRESS RESP | (GUID, ReID, INT Mode, ErrorEnum ErrorCode, STRING ErrorDescription) |
| 577 | SEARCH DEVICE REQ | GUID, ReID, GUID SearchID, BOOL bSecure, STRING SubnetScope |
| 578 | SEARCH DEVICE RESP | (GUID, ReID, INT Mode, ErrorEnum ErrorCode, STRING ErrorDescription) |
| 579 | REMOVE REQUEST REQ | (GUID, ReID, GUID NotificationID) |
| 580 | REMOVE REQUEST RESP | (GUID, ReID, INT Mode, ErrorEnum ErrorCode, STRING ErrorDescription) |
| 581 | NEW DEVICE REQ | (GUID, ReID, GUID NotificationID, NewDeviceStruct Device) |
| 582 | NEW DEVICE RESP | (GUID ReqID, ErrorEnum ErrorCode, STRING ErrorDescription) |
| 583 | FOUND DEVICE REQ | (GUID ReqID, NewDeviceStruct Device) |
| 584 | FOUND DEVICE RESP | (GUID ReqID, ErrorEnum ErrorCode, STRING ErrorDescription) |

Functional Message List — 570

FIG. 5e

| | Operation | Message | Message from | Message to |
|---|---|---|---|---|
| 801 | Multicasting | WHO_IS_ASDA | Printer Server 712 | Subnet 701 |
| 802 | Multicasting | ASDA_AD | ASDA 711 | Subnet 701 |
| 803 | Unicasting | SEARCH_DEVICE | Printer Server 712 | ASDA 711 |
| 804 | Searching | | ASDA 711 | |
| 805 | Unicasting | FOUND_DEVICE | ASDA 711 | Printer Server 712 |
| 806 | Multicasting | WHO_IS_ASDA | ASDA 711 | Subnet 702 |
| 807 | Unicasting | ASDA_AD | ASDA 722 | ASDA 711 |
| 808 | Unicasting | SEARCH_DEVICE | ASDA 711 | ASDA 722 |
| 809 | Searching | | ASDA 722 | |
| 810 | Unicasting | FOUND_DEVICE | ASDA 722 | Printer Server 712 |
| 811 | Multicasting | WHO_IS_ASDA | ASDA 722 | Subnets 701, 703, and 704 |
| 812 | Unicasting | ASDA_AD | ASDA 711, 732, and 741 | ASDA 722 |
| 813 | Unicasting | SEARCH_DEVICE | ASDA 722 | ASDA 732 and 741 |
| 814 | Searching | | ASDA 732 and 741 | |
| 815 | Unicasting | FOUND_DEVICE | ASDA 732 | Printer Server 712 |
| 816 | Multicasting | WHO_IS_ASDA | ASDA 732 | Subnets 702 and 704 |
| 817 | Unicasting | ASDA_AD | ASDA 722 and 741 | ASDA 732 |
| 818 | Unicasting | SEARCH_DEVICE | ASDA 732 | ASDA 741 |
| 819 | Searching | | ASDA 741 | |
| 820 | Multicasting | WHO_IS_ASDA | ASDA 741 | Subnets 702, 703, 705 |
| 821 | Unicasting | ASDA_AD | ASDA 722, 732 and 751 | ASDA 741 |
| 822 | Unicasting | SEARCH_DEVICE | ASDA 741 | ASDA 751 |
| 823 | Searching | | ASDA 751 | |
| 824 | Multicasting | WHO_IS_ASDA | ASDA 751 | Subnet 704 |
| 825 | Unicasting | ASDA_AD | ASDA 741 | ASDA 751 |

FIG. 8

DISTRIBUTED DEVICE DISCOVERY FRAMEWORK FOR A NETWORK

FIELD OF THE INVENTION

This invention generally relates to the area of computer systems. More particularly, the present invention concerns distributed networks, and methods and systems for discovering resources (e.g. devices) in distributed networks.

BACKGROUND OF THE INVENTION

As computer network technology matures, enterprise-wide networks are evolving from simple, isolated local area networks into complex distributed networks. Today's larger enterprise-wide networks include hundreds of nodes comprising computers and network devices capable of carrying out a variety of tasks. Examples of network nodes include personal computers (workstations) running application software, printers, scanners, facsimile machines, plotters, file servers, external network communication interfaces, etc.

The increased number of nodes within enterprise-wide networks, as well as the increased breadth of configuration information maintained for such nodes, raises a need to automate network device/node discovery. Device discovery involves populating resource information tables with information defining particular attached devices. Such information can include by way of example: location (e.g., the TCP/IP network address/port of the resource, the HTTP URL, etc.), model/manufacturer name, protocols supported, configurations (for example, resource model, command set, network protocol, and memory size), and operational statuses (e.g., good, poor, or malfunction). Such discovery facilitates advertising resource locations (addresses) to requesting clients, configuring nodes for network communication, and managing the nodes' operation. Automated network device discovery facilitates discovering network resources and storing such information in a manner that enables client nodes to search for and gain access to shared resources in potentially very large enterprise-wide networks.

In many instances enterprise-wide networks are divided into subnets. Such networks are divided into subnets for a variety of reasons. One reason is cost. Enterprise-wide networks in many instances are spread over large geographic regions—even across multiple continents. From a cost perspective, it is impractical to maintain a permanent, fully functional link between nodes located across such large distances. Networks comprising multiple subnets temporarily enable communication between nodes on distinct subnets by activating bridges that link the two subnets on an as needed basis.

Another reason to divide a network into subnets is performance. Long-distance wide area network links generally support substantially lower bandwidth than local area networks. Furthermore, request conflicts and increased sharing of available bandwidth can lead to unacceptable communication delays as more communicating nodes are added to a network link. In the case of a link that allows asynchronous transmission requests, the likelihood of colliding requests increases. Even in cases where collision avoidance techniques are used, for example when each node is assigned a particular time slot in which to request access to the link to complete a transmission, the effective transfer rate can become unacceptably low when too many requestors are present. Thus, in cases where a large number of nodes communicate with one another relatively frequently, each communicating node on the shared link is allocated substantially less bandwidth than is generally needed by the nodes.

However, the above problems associated with very large, non-segmented networks can be addressed in many instances by creating subnets. Dividing a large network into subnets raises penetrable barriers between the groups of nodes that make up each of the subnets. Communications from a first node addressed to a second node within a subnet generally are not passed outside the subnet within which the communications originate. In order to pass outside the subnet a sending node generates a message with an address that references another subnet. Such barriers achieve reductions in unnecessary transmissions outside the network. However, such barriers inhibit device discovery over a network. The degree to which the subnet barriers can inhibit or unduly complicate device discovery outside a subnet is addressed herein below with reference to known discovery methods.

Resources connected to a network may comply with differing communication protocols. Examples of such protocols include Transport Control Protocol over Internet Protocol (TCP/IP), or Universal Plug and Play (UPnP). Moreover, the resources may associate with disparate operating systems. For example, a networked printer may be associated with a printer server that operates Windows NT in one subnet, whereas a networked scanner may be associated with another printer server that operates Linux in another subnet. In some cases network device vendors provide means for facilitating discovery of their devices that are independent of the devices' operating system environments.

An exemplary enterprise-wide distributed network links multiple subnets together. Each subnet is associated with security principle, which determines groups of users who have access to the subnet. Different subnets are associated with separate security principles. Thus, a client in a subnet may not be allowed to discover a resource in a subnet that has a different security principle. Furthermore, a subnet may reside in a remote geographical location that cannot be reached by a multicast message. Consequently, a client in one subnet may not be able to search resources in a remote subnet, even though the two subnets have the same security principle.

A number of network device discovery methods are utilized in networks. Service Location Protocol (SLP) is an IETF standard that provides a scalable framework for automatic resource discovery on Internet Protocol networks. It bases its discovery mechanism on service attributes, which are essentially different ways of describing a service.

Universal Plug and Play (UPnP) is an evolving architecture developed by MICROSOFT to extend an original MICROSOFT Plug and Play peripheral model to a network environment including many network devices supplied by different vendors. UPnP operates primarily at low level network protocol layers, for example, the TCP/IP layer. UPnP uses a Simple Service Discover Protocol (SSDP) to discover services on Internet Protocol based networks.

SUMMARY OF THE INVENTION

The present invention comprises a method and system for discovering resources in a network having multiple subnets. Discovery agents are employed on a subnet to identify resources, and in particular embodiments devices (e.g., printers), that are accessible to other nodes within a network. Simple discovery agents (SDAs) perform a set of operations facilitating sharing resource discovery information, provided by discovery agents within a subnet, with requesting nodes throughout a network. Such sharing of network resource data facilitates dynamic discovery of devices outside a subnet.

Since subnets support multiple SDAs, steps are taken to reduce the number of SDAs that respond to inter-subnet requests for identification of network resources. A selection process establishes an active simple discovery agent (ASDA) that responds to requests to identify instances of a network resource (e.g., a printer) within a particular subnet. ASDAs also propagate the resource identification requests to neighboring ASDAs, thereby enabling a resource (e.g., device) discovery request to reach the subnets of a network that contain at least one ASDA via an ASDA mesh linking the neighboring subnets.

In an embodiment of the invention, the ASDAs establish an ASDA mesh over the network via queries to neighboring subnets. A requesting ASDA transmits multicast queries on adjacent subnets seeking identification of ASDAs on those subnets. The ASDAs on the adjacent subnets issue responses advertising their network addresses and ASDA status. The returned addresses are stored by the requesting ASDA.

ASDAs are the designated inter-subnet resource discovery actors for the subnets with which they are associated. Thus, if a resource identification request designates the particular subnet, then the ASDA provides a response identifying relevant resources (e.g., printers) to the requester (e.g., a print server that originated the request). Otherwise, a receiving ASDA forwards the request to adjacent ASDAs based upon their previous responses, but does not issue a response to the original requester.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 illustratively depicts an SDA list that identifies neighboring SDAs to an ASDA for purposes of propagating network-wide device discovery;

FIGS. 5a, 5b, 5c, 5d and 5e demonstrate the messages and message formats utilized to carry out ASDA notification and resource discovery in a network embodying the present invention;

FIG. 8 summarizes an exemplary sequence of steps performed by the network depicted in FIG. 7 to carry out a network-wide search for network printers in accordance with an application of the present invention.

DETAILED DESCRIPTION OF THE DRAWINGS

Figure 1:
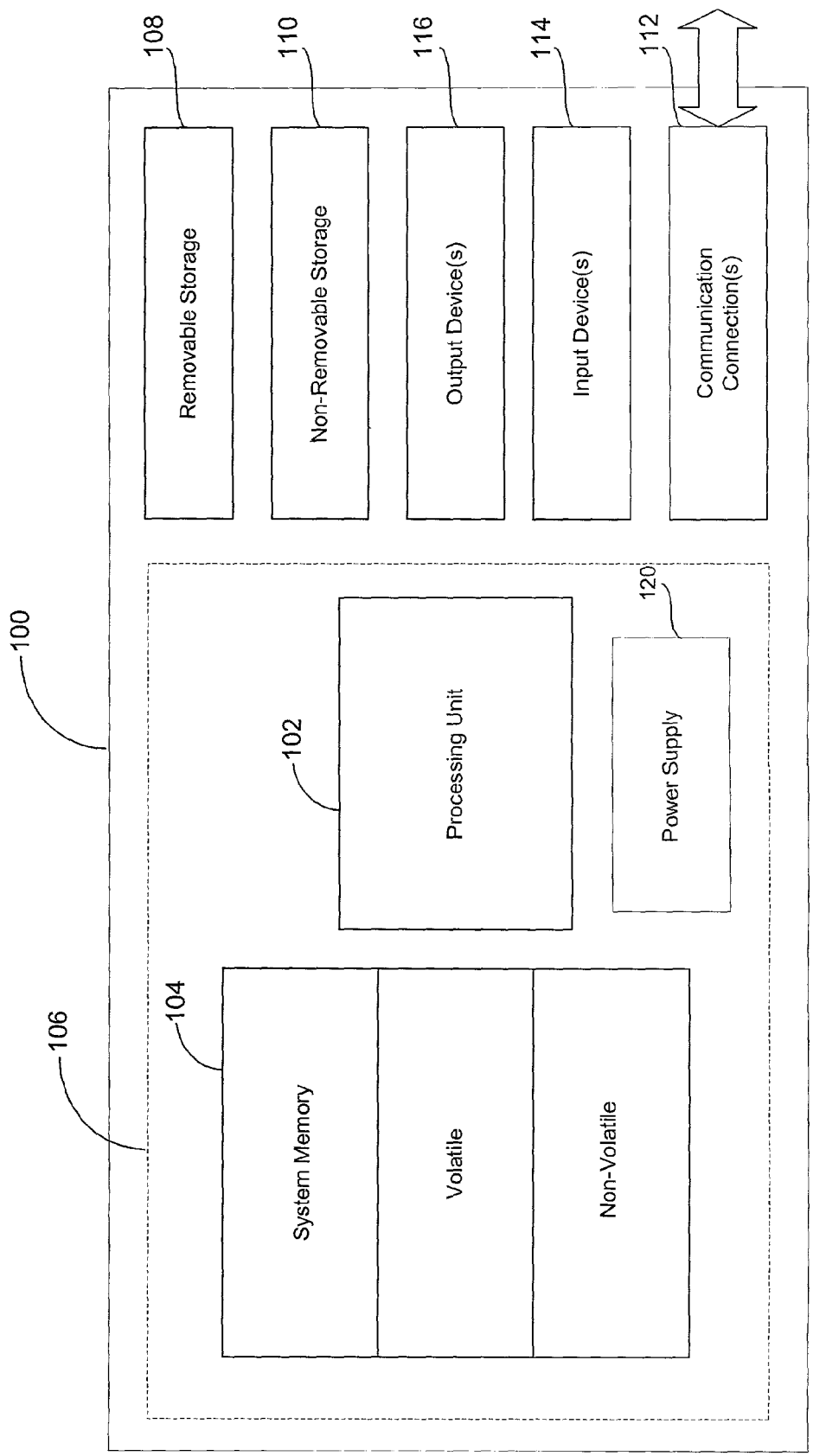
FIG. 1 is a simplified schematic illustrating a computing device architecture employed by a computing device upon which embodiments of the invention may be executed.

In accordance with an exemplary embodiment of the invention described herein below simple discovery agents are executed upon nodes within subnets of an enterprise network. An active simple discovery agent (ASDA) is established in each of the subnets of the network. Each ASDA discovers ASDAs residing on other subnets within the network and maintains a list of the discovered ASDAs. An ASDA searches for ASDAs and requested resources within the network by searching for ASDAs on adjacent networks and propagating received ASDA search requests to ASDAs on adjacent subnets. In a particular embodiment of the invention, a directory service maintains a record of the ASDA lists.

The present invention facilitates discovering resources, such as printers, in a distributed network having multiple subnets when such resources are not located upon a same subnet as a requestor. Such instances arise for example when a user in a first subnet at a remote office seeks to print a document at a printer located at an enterprise's main office located some distance from the remote office. In that case, a print server at the remote office passes the request from the remote subnet to a printer located at the main office subnet. However, in order to complete such a transmission, the remote print server generally provides an address for the main office printer.

Before describing particular ones of the figures, a number of general definitions are provided for terms that are used extensively herein below. Terms are generally described through examples and descriptions of general functionality. It is noted that such definitions are primarily intended to render illustrative exampled of the present invention.

The term "resource" as used herein includes a variety of network nodes. Such network nodes include printers, workstations, servers (for example, printer servers or file servers), scanners, services, programs, hardware, etc. The resources communicate over the network via communication protocols such as, for example, TCP/IP.

An SDA (simple discovery agent) executes upon a subnet node and, using one or more discovery protocols, renders a set of resources presently located on the subnet. Locally, subnets implement resource discovery protocols, for example, UPnP or simple-location-protocol (SLP). A search for resources within a subnet is performed according to any of many known and available discovery/search protocols. It is noted that the present invention does not, in its broadest sense, require discovery of local (subnet) resources according to any particular discovery protocol. The present invention instead concerns how locally discovered resources are discovered by resource users located upon different subnets.

An ASDA is a specially designated SDA, established in each subnet, for discovering other ASDAs on other subnets of a network. The discovery process, by way of example includes ASDA search requests passed to neighboring subnets. A network directory service stores information comprising resource discovery information regarding the ASDAs in the network.

Although not required, in an embodiment of the present invention a computer implements the above-summarized functionality by executing instructions, such as program modules. Generally, program modules include routines, objects, components, data structures and the like that facilitate performing particular tasks or implementing particular abstract data types. The term "program" includes one or more program modules.

The invention is capable of being carried out on a variety of conventional and unconventional computing machine types including: cell phones, personal computers (PCs), hand-held devices, multi-processor systems, microprocessor-based programmable consumer electronics, network PCs, minicomputers, mainframe computers and the like.

With reference to FIG. 1, an exemplary system for implementing SDAs and ASDAs the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain one or more communications connections 112 that allow the device to communicate with other devices. Communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 100 may also have one or more input devices 114 such as keyboard, mouse, pen, voice-input device, touch input device, etc. One or more output devices 116 such as a display, speakers, printer, etc. may also be included. All these devices are well known in the art and need not be discussed at greater length here.

Figure 2:
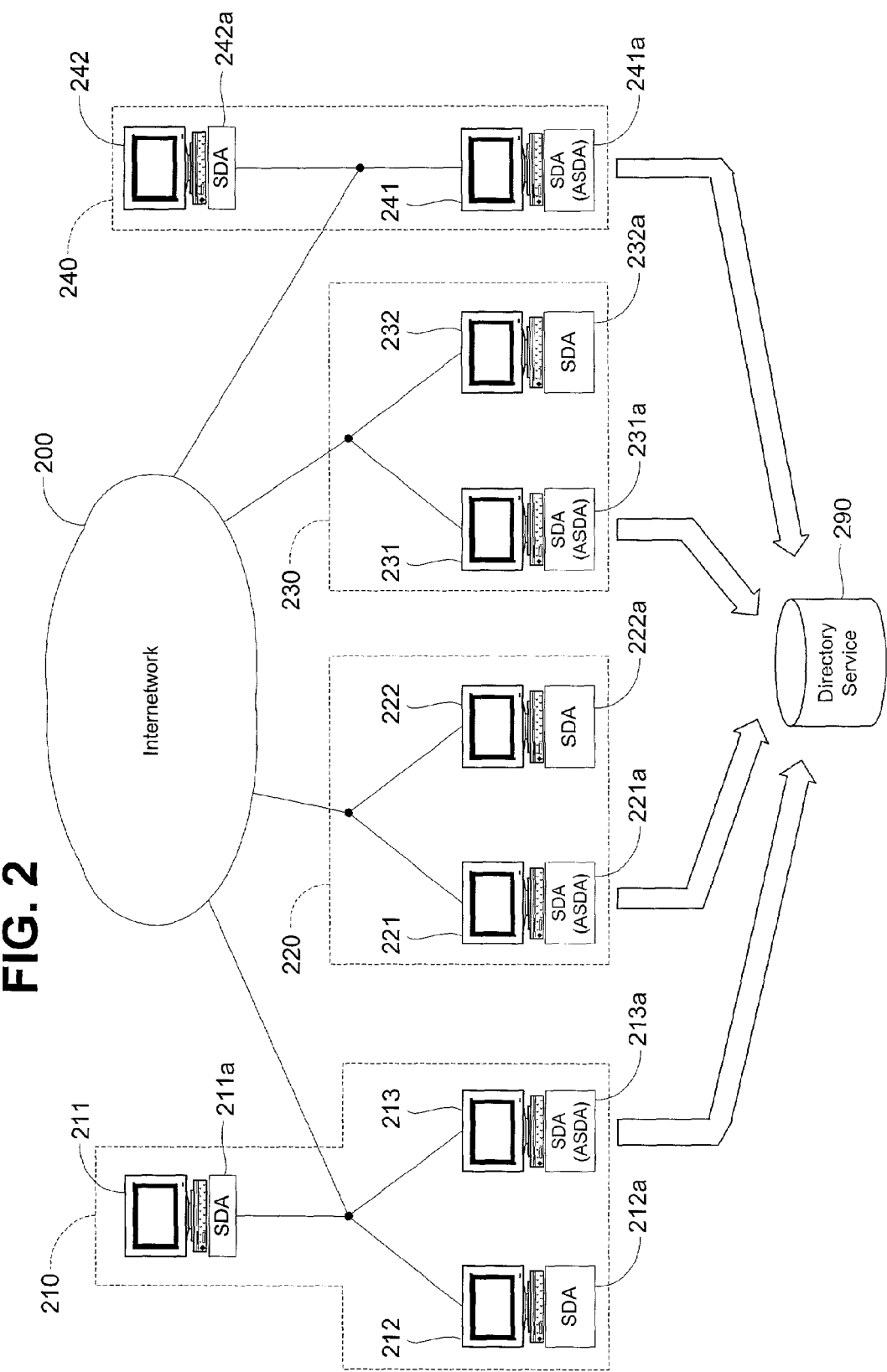
FIG. 2 is a diagram of an exemplary distributed network environment in which the invention is employed.

FIG. 2 illustratively depicts an exemplary distributed network in which an embodiment of the invention is deployed. An internetwork 200, that can take on a variety of different configurations, links subnets 210, 220, 230, and 240. The internetwork 200 could, itself, be a subnet in other embodiments of the invention. However, in the present example, internetwork 200 comprises a set of links and routers that effectively link each of the subnets 210, 220, 230 and 240 comprising network communication boundaries at their point of connection to the internetwork 200.

Each of the subnets 210, 220, 230 and 240 comprises a locally linked set of resources. For example, subnet 210 includes resource 211, resource 212, and resource 213. Subnet 220 includes resource 221 and resource 222. Subnet 230 includes resource 231 and resource 232. Subnet 240 includes resource 241 and resource 242. A particular example of a resource is a network printer. However, as mentioned previously herein above, the term resources in the context of the present invention encompasses a variety of network devices. Within each subnet, device discovery agents (DDAs) execute known local and network device discovery protocols.

In the example depicted in FIG. 2, device discovery performed within subnets by known DDAs is augmented by simple discovery agents (SDAs) that extend device discovery, beyond subnet barriers, to an entire network. In a particular embodiment of the invention, the SDAs are specialized to handle network printer discovery. However, the functionality of SDAs is not limited to a particular device type. Each SDA, when active, shares accumulated device discovery information within its subnet with requesters located outside the SDA's subnet. Device discovery requests are propagated to such SDAs via a mesh linking neighboring active simple discovery agents (ASDAs) that are selected to carry out inter-subnet discovery through ASDAs in neighboring subnets.

With specific reference to FIG. 2, SDA 211a, SDA 212a, and SDA 213a execute respectively on resource 211, resource 212, and resource 213 in subnet 210. SDA 221a and SDA 222a execute respectively on resource 221 and resource 222 in subnet 220. SDA 231a and SDA 232a are installed in resource 231 and resource 232 in subnet 230. SDA 241 and SDA 242 execute on resource 241 and resource 242, respectively in subnet 240. It is noted that designating a network resource as having an SDA identifies a capability of such node to support distributed device discovery operations. However, only an active SDA (ASDA) executes distributed device discovery operations.

In each subnet, an ASDA is selected from the multiple identified SDAs of the subnet. Though a subnet conceivably includes multiple ASDAs, such redundancy is not necessary or particularly desirable. The ASDA on each subnet is responsible for maintaining identification information for ASDAs in other subnets within the network and maintaining a list of addresses of the discovered ASDAs for purposes of creating a resource discovery mesh across the entire enterprise network. In a particular embodiment of the invention, each ASDA is responsible for maintaining a list of the ASDAs within adjacent (neighboring) subnets. The extent of each ASDAs discovery of other ASDAs (such as its ability to pass discovery requests through subnets that do not have an ASDA) is modulated by a time-to-live (TTL) value in requests to neighboring subnets for identification of their ASDAs. Thus, in the case of large networks each ASDA maintains only a subset of the entire set of ASDAs within a network. However, in the event that access to a complete set of ASDAs is required, a network-wide set of ASDA addresses is maintained within a directory service 290 and replicated over multiple subnets within the enterprise network.

With continued reference to FIG. 2, SDA 213a, SDA 221a, SDA 231a, and SDA 241a are selected as ASDAs for subnet 210, subnet 220, subnet 230, and subnet 240, respectively. Each ASDA communicates with an ASDA within each neighboring subnet (in this particular example all subnets are neighboring) to obtain identification information for each neighboring ASDA.

The ASDAs within each of the subnets communicate with the directory service 290 to store at least the ASDA identity information of the type maintained by the ASDAs within the network depicted in FIG. 2. The directory service 290, though shown as a single entity, is actually carried out as a set of replicas located on multiple ones of the set of subnets 210, 220, 230 and 240. The directory service 290 typically stores more information than the ASDAs—for instance, the directory service 290 stores information identifying discovered devices such as printers located upon remote subnets. However because the directory services perform replication on a periodic basis, the ASDA and device discovery information in the directory services is generally not as fresh as the information obtained by propagating a request through the ASDAs.

To successfully locate a resource (or resources) in a target subnet, the ASDA in the same subnet as an originator of the request determines the identity/address of the ASDAs in the neighboring subnets, and then ASDA passes the request to the neighboring ASDAs. The recipients, in turn pass the received request until the request has propagated to at least the ASDA in the target subnet. The ASDA in the target subnet issues a response to the originator of the request including the requested resource information.

Utilizing the above-described mesh comprising neighboring ASDAs in a network, a resource discovery request propagates through the network via the mesh until the request is received by an ASDA associated with the target subnet. The target ASDA determines whether a requested resource is available on the target subnet. The target ASDA thereafter issues a response to the issuer of the resource discovery request.

To ensure proper operation of an ASDA in each subnet, any one of multiple SDAs in a subnet are capable of operating as the ASDA for the subnet. To avoid excessive, redundant communications it is preferable to only have a single ASDA at any time for a subnet. The selection of an ASDA is accomplished by either manual assignment or automatic selection according to an automated selection procedure. Such selection is discussed herein with reference to FIGS. 6a-6f. In any case, ASDA selection preferably includes comparing various properties of the computing nodes upon which the candidate SDAs reside. Examples of potential selection criteria include: operating system version, primary (physical) memory size, or central processing unit (CPU) speed.

In an exemplary enterprise network environment, security properties, which are referred to herein as trusted domains are utilized to establish potential candidates for ASDA status. In particular, SDAs that are trusted within the subnet are considered for appointment to ASDA status. Furthermore, trust relationships can also be extended to access by ASDAs to neighboring ASDAs.

In an embodiment of the invention such as the one depicted FIG. 2, ASDAs on adjacent (neighboring) subnets communicate with one another to establish an enterprise-wide SDA mesh. The SDA mesh enables propagation of a network resource discovery request anywhere within the network covered by the SDA mesh. In the particular example, each of the ASDAs 213, 221, 231 and 241 transmits a multicast request onto each of its neighboring subnets for the identity of the ASDA on the neighboring subnets. In the present case, all of the subnets are immediate neighbors. Therefore, a request from ASDA 213 is received by neighboring ASDAs 221, 231, and 241. Each of the ASDAs 221, 231 and 241 issue unicast responses to ASDA 213 advertising their ASDA status and their network addresses. In an embodiment of the invention, a failure by any of the ASDAs 221, 231, or 241 to respond to the multicast request by ASDA 213 automatically invokes an ASDA selection process within the non-responding ASDA's subnet. Therefore, each of the replying ASDAs also issues a multicast response within its own subnet to inform other SDAs within the subnet that it has responded.

After establishing the ASDA communication mesh capability described above, the ASDAs propagate resource (e.g., printer) discovery requests received from nodes within their subnets to the ASDAs on the neighboring subnets. For example, ASDA 213 receives a request from resource 211 (e.g., a print server) of subnet 210, for discovery of all printers on subnet 240. The ASDA 213 propagates the request (including the network address of the requesting resource 211) via a unicast message to ASDAs 221, 231 and 241 on neighboring subnets 220, 230 and 240. The ASDAs 221 and 231 pass the request on to any neighboring subnets other than the source of the request (which do not happen to exist in this particular illustrative network configuration). Since ASDAs 221 and 231 do not reside on the identified subnet (240), they do not issue a response to the resource 211. The ASDA 241 however, recognizes the request as being directed to its subnet 240, and the ASDA 241 issues a response to the requesting resource 211's address including discovery information that it presently possesses with regard to any printers on subnet 240.

Figure 3:
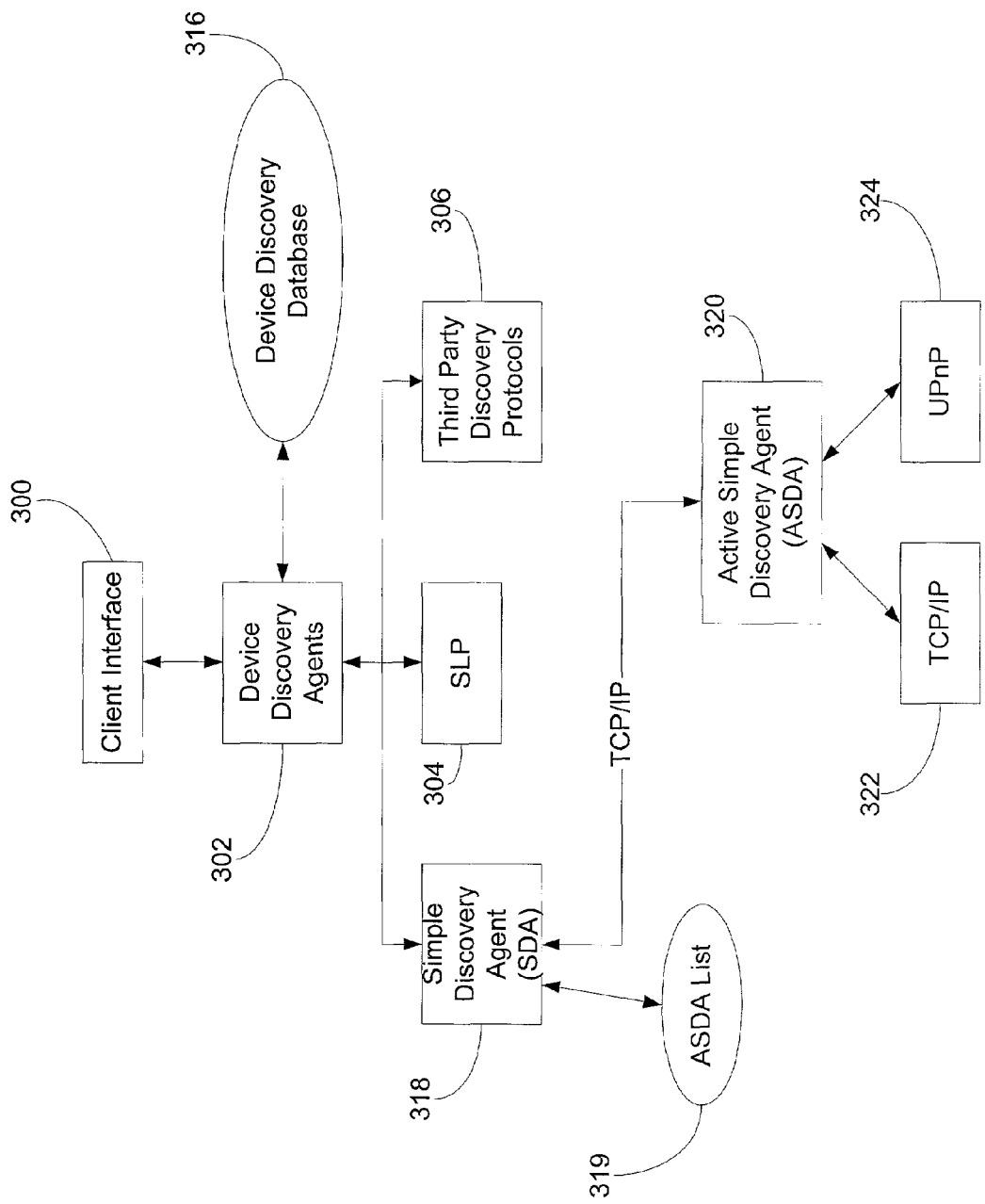
FIG. 3 illustrates a simplified structure of a network node containing discovery agents for carrying out inter-subnet resource discovery.

FIG. 3 illustratively depicts an overview of an exemplary discovery arrangement within a computing machine including an SDA embodying the present invention. In the exemplary device discovery arrangement depicted in FIG. 3, a client interface 300, implemented via COM or alternatively any other suitable technology, communicates via remote procedure calls with device discovery agents 302. A local discovery agent (not shown) discovers devices directly connected to a machine and utilize, for example, PnP protocols. The device discovery agents 302 comprise well known methods of device (e.g., printer) discovery within a subnet. The device discovery agents 302 incorporate a variety of protocols including, by way of example, UPnP, SLP 304, TCP/IP (including SNMP Broadcast/Multicast, Ping, MICROSOFT DHCP, etc.), and other third party discovery agent 306 protocols to discover, within a subnet, devices that incorporate corresponding discovery methods/protocols. As indicated by the third party discovery agent 306 protocols, the subnet device discovery framework is extensible, and thereby supports expansion of the device discovery capabilities of the device discovery agents 302 to accommodate previously unsupported device discovery methods/standards.

The device discovery agents 302 obtain information from devices within the network and publish that information into a device discovery database 316. The device discovery information stored within a device discovery database 316 structure is available to (or maintained by) all SDAs. In an embodiment of the invention, the device discovery database 316 is sub-divided according to the device discovery agent protocols that are utilized to obtain the information for devices within the subnet. Though not depicted in the drawings, an embodiment of the invention includes device discovery agent management (DDM). The DDM facilitates installing and removing particular device discovery agents in the set of device discovery agents 302 and registers their existence on a device discovery information container. The DDM creates the subdirectory in the device discovery database 316 corresponding to a newly installed device discovery agent on a computing machine.

The present invention addresses sharing the above-described "local" device discovery information, rendered by local discovery agents within a subnet, with requestors located anywhere in a network. This capability is provided in a scalable and reliable manner by simple discovery agents (SDAs) such as an SDA 318 depicted in FIG. 3. A particularly useful application of the SDA capabilities is automated network printer discovery between subnets in a large distributed network environment. In such instances, users within a first subnet can identify (via automated processes) and then utilize a printer located within a second subnet. However, the extent of SDA applications is not limited to printer discovery. Rather, it can be utilized to discover a variety of device types including scanners, fax machines, etc.

Within a network comprising multiple subnets, the SDA 318 carries out an inter-subnet device discovery information sharing method described herein. This method includes establishing the identities of active SDAs (ASDAs) within adjacent subnets, and then passing received inter-subnet device discovery requests to the identified ASDAs on the adjacent subnets. The addresses of the neighboring ASDAs are maintained in an ASDA list 319 (described herein below with reference to an exemplary format depicted in FIG. 4). Furthermore, if the SDA 318 receives a device discovery information request identifying its subnet, then the SDA 318 provides information regarding discovered devices on the SDA 318's subnet to the network address identified in the received request. Such device discovery information obtained by the active SDA 318 from the device discovery directory 316.

In the particular example set forth in FIG. 3, the active SDA 318 identifies an ASDA 320 on a neighboring subnet within a network. Communications between the ASDA 318 and ASDA 320 are performed over a TCP/IP-based connection 321. The ASDA 320 in turn implements local discovery protocols to discover devices (e.g., printers) on it subnet. In the illustrated example, the ASDA 320 obtains local device information from its device discovery database (not shown) retrieved from devices on the ASDA 320's subnet according to TCP/IP 322 and UPnP 324 protocols.

Turning now to FIG. 4, an exemplary ASDA list 410 for ASDA 213 (of FIG. 2) is depicted in the form of an XML schema. However, such information can be stored in a variety of formats including a directory tree structure of the type used to store such data in a directory service subdirectory under an SDAList root. ASDA list 410 includes a set of SDA entries identifying the subnet and IP address for each of the three other currently active SDAs 221a, 231a, and 241a. The XML schema as well as the values of the subnet and IP addresses for each neighboring ASDA are merely exemplary. The directory service 290 contains similar information. However, the directory service 290 maintains data for all subnets rather than particular ones of the subnets. In an embodiment of the invention, the directory service 290 structure is augmented to incorporate subnet connectivity information (e.g., lists of adjacent subnets, connectivity information, etc.) as well as the last known address information for ASDAs.

Turning to FIGS. 5a, 5b, 5c, 5d, and 5e a set of exemplary message types are illustratively depicted that are utilized by ASDAs to find adjacent ASDAs and submit resource identification requests to such ASDAs once they are found. In particular, a WHO_IS_ASDA message 501 is issued to invoke a response by an ASDA advertising its ASDA status. When a non-ASDA resource (e.g., a print server) multicasts the WHO_IS_ASDA message 501 within a subnet, the ASDA on the subnet responds by multicasting an ASDA_AD message 502.

Furthermore, an active ASDA (e.g., ASDA 213a) multicasts the WHO_IS_ASDA message 501 to each of the neighboring subnets (e.g., subnet 220) to obtain the identity of the neighboring ASDAs (e.g., ASDA 221a) and facilitate the creation of an ASDA mesh across the multiple subnets within the network. The ASDAs within the neighboring subnets each unicast the ASDA_AD message 502 back to the originating ASDA (e.g., ASDA 213a) thereby declaring each responding SDA entity as the ASDA for the identified subnet. The ASDA_AD messages 502 from the neighboring ASDAs are used by the originating ASDA to build its ASDA list illustratively depicted in FIG. 4.

An SDA_WILLING message 503 is multicast by any SDA on a subnet. The SDA_WILLING message 503 is transmitted during bidding stage for selecting an ASDA among potentially several available SDAs on a subnet. The SDA_WILL-ING message 503 indicates that the issuer of the message seeks to compete with other SDAs on a subnet for ASDA status.

A SEARCH_DEVICE message 504 is a unicast message that initiates a search for a device, or more generally a resource. The SEARCH_DEVICE message 504 is issued by a requesting resource (e.g., a print server) to either an ASDA on the resource's subnet or a directory service. A resource on a subnet unicasts the SEARCH_DEVICE message 504 to the ASDA on its subnet and initiate a search for a resource. An example of such a request is to find all printers on a network. In response, the ASDA on the subnet unicasts the SEARCH_DEVICE message 504 to each of the ASDAs on neighboring subnets. By repeating the request message at receiving ASDAs, the SEARCH_DEVICE message 504 is propagated on an ASDA mesh throughout the network.

Rather than search for a device or resource via the ASDA the ASDA mesh, a requesting resource issues a SEARCH_DEVICE message 504 to a known directory service address. The directory service is located on the subnet or alternatively on another subnet within the network.

If a recipient of a SEARCH_DEVICE message 504 has responsive device/resource information, the recipient issues a FOUND_DEVICE message 505. In an embodiment of the invention, the FOUND_DEVICE message 505 is unicast to the originating device/resource. For example, if the requester is a print server on a first subnet, then all responses from ASDAs or the directory service are unicast directly back to the requesting print server.

Turning briefly to FIGS. 5b and 5c, exemplary multicast and unicast message formats are illustratively depicted. Referring to FIG. 5b, an exemplary multicast message structure is depicted. Multicasting data structure 510 comprises a multicast IP address 511, a port number 512, and miscellaneous other data 513. The multicast IP address 511 either designates all recipients on a subnet or alternatively directs the message to be transmitted throughout the network (limited by a TTL value to neighboring subnets). An exemplary multicast IP address is 224.224.0.1. Though not depicted in FIG. 5b, the multicast message 510 also includes a message source identifying the immediate sender of the message. The message source may differ from an originator of a message (e.g., a print server originating a SEARCH_DEVICE request message 504) which is identified within the other data field 513.

The port number 512 identifies the port of a recipient to which a received data packet should be forwarded. In general, a port number is associated with a program or a process running on a networked machine. By way of example, the SDA on an ASDA is assigned a particular port number (e.g., 1800). The port number can also be used to specify a particular function to be performed by a message recipient. However, in an embodiment of the invention, parameters identifying a particular request/function are passed in the other data field 513. The other data field 513 is also utilized to pass back requested information about discovered devices. As mentioned previously herein above, the other data field in a request message holds the network address of the originator of the discovery request (e.g., a print server).

Referring to FIG. 5c, an exemplary unicast message structure 520 is depicted. The unicast message data structure 520 comprises a unicast IP address 521, a port number 522, and miscellaneous other data 523. An exemplary unicast IP address is 192.168.1.100. The unicast message IP address differs from the multicast message in the sense that a particular destination address is specified. Though the content differs, the form of the unicast message is essentially the same as a multicast message and therefore the description of the port number 522 and the other data 523 will not be repeated. One example of a unicast message, a FOUND_DEVICE message 505, includes device discovery information returned to the originator of the device search request.

A set of administrative messages are provided the administer to the ASDA mesh and maintain its healthy state of operation. A set of administrative messages is provided, by way of example, in FIG. 5d. A GET_VERSION REQ message 551 enables an SDA administrator to request a version for software associated with an SDA such as an operating system to determine a best candidate SDA during an ASDA selection process. An SDA responds by issuing a GET_VERSION RESP message 552 that informs the requester of the version number (e.g., 4.1).

An ASDA, once selected, issues messages to interested parties on a subnet or network (a neighboring ASDA) informing them of its presence. A HEARTBEAT REQ message 553 is issued by an ASDA to its neighboring ASDAs to ensure that they are operating properly. A HEARTBEAT RESP message 554 informs the requesting ASDAs that the recipient of a previous HEARTBEAT REQ message 553 is indeed operational.

When an ASDA shuts down on its own, it informs neighboring ASDAs to ensure that they do not issue further requests until a replacement ASDA advertises itself. A SHUTDOWN REQ message 555 informs the neighboring ASDAs of the issuer's shut down. Recipients respond via a SHUTDOWN RESP message 556 acknowledging receipt of an instance of the SHUTDOWN REQ message 555.

Turning to FIG. 5e, a set of function packets 570 supported by SDAs to carry out device discovery are listed. A REGISTER NOTIFICATION REQ 572 notifies SDAs of a registerable entity in a subnet. An SDA responds to the registration request with a REGISTER NOTIFICATION RESP 574 informing the requester of the SDAs action (e.g., target SDA "interested", "discarded", and "redundant").

When an entity requests device discovery information, it may thereafter monitor progress by issuing a PROGRESS REQ 575. A corresponding PROGRESS RESP 576 provides a level of completion value to the requester.

One of the primary functions performed by ASDAs is to provide requestors with device discovery information. A SEARCH DEVICE REQ 577 and its corresponding response message SEARCH DEVICE RESP 578 initiate a searching operation. An ASDAs response informs the sender that the ASDA: is interested, discarded the request, or the request was redundant.

A REMOVE REQUEST REQ 579 and its corresponding REMOVE REQUEST RESP 580 enable a requester to withdraw any previous request to an SDA.

A NEW DEVICE REQ 581 message and its corresponding NEW DEVICE RESP 582 facilitate adding a new entity that is to be notified in association with an identified request.

A FOUND DEVICE REQ 583 and FOUND RESOURCE RESP 584 are the messaging mechanisms for ASDAs to notify requesters of devices/resources located in response to a device discovery request. This request/response pair follows the SEARCH DEVICE REQ/RESP 575/576 that initiates a search for devices on an ASDAs subnet.

In an embodiment of the invention, SDA capability is incorporated into multiple nodes on a subnet. However, only one of the SDA-ready nodes is needed to create a network-wide mesh, and therefore only one SDA is selected in a subnet as the active SDA (ASDA). In some instances, the selection of an ASDA is accomplished by an automated election process from the willing SDAs in a subnet according to an automated election procedure. The various states of operation of a subnet with regard to ASDA election are illustrated, by way of example, in FIGS. 6a-f.

Figure 6A:
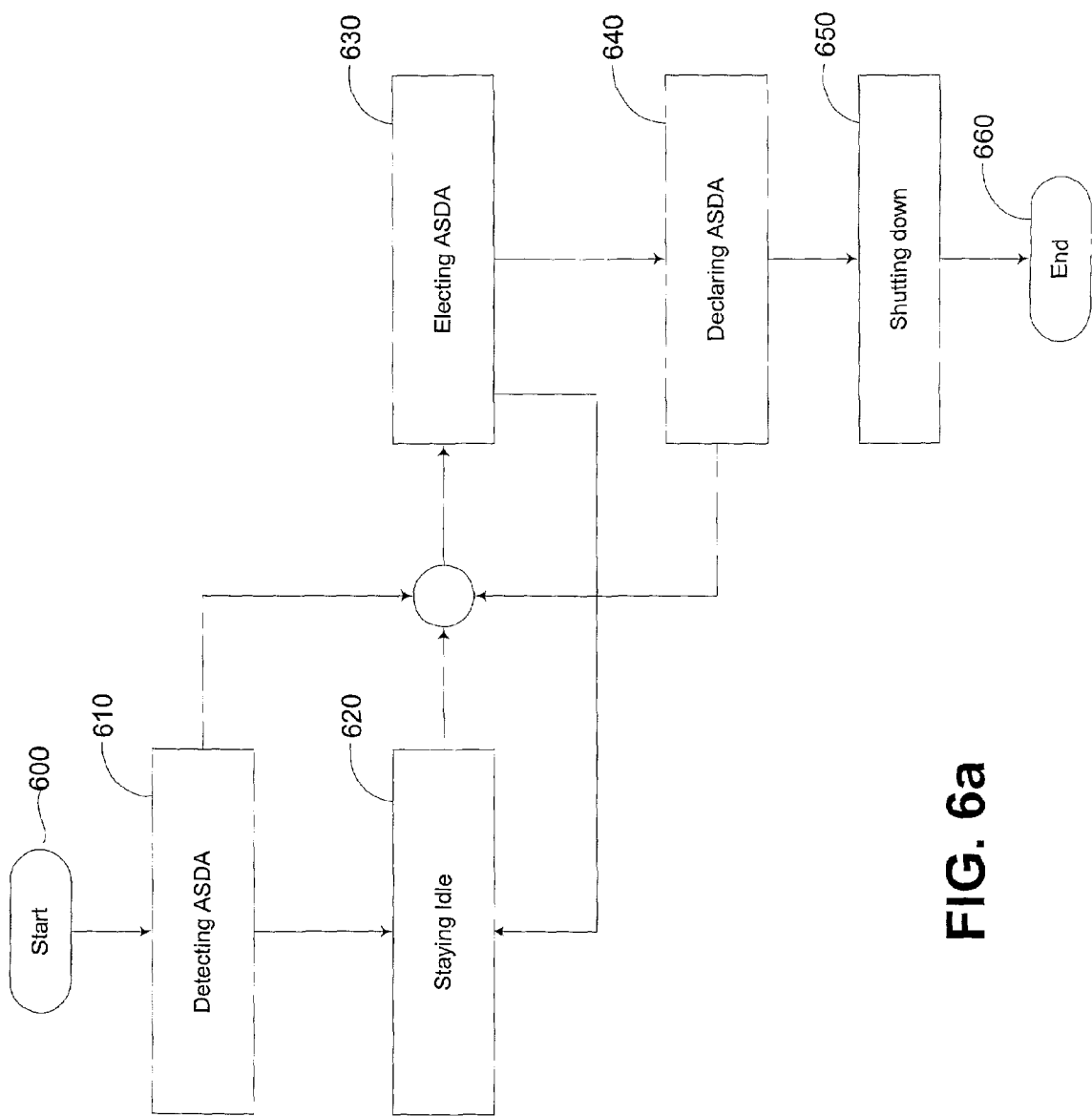
FIGS. 6a, 6b, 6c, 6d, 6e, and 6f are flowchart/state diagrams illustratively depicting an exemplary flow of operations performed by an SDA embodying the present invention while participating in an automated ASDA selection process.

Referring to FIG. 6a, a set of states are depicted that generally describe the transitions of an SDAx during its lifetime in a system incorporating an ASDA election procedure. The election algorithm starts at 600 and passes to state 610 wherein the SDAx attempts to detect an ASDA within its subnet. If a better SDA is present, then the SDAx transitions to an idle state 620. Otherwise, the SDAx passes from state 610 to an election state 630. The SDAx transitions from the idle state 620 to the election state in response to an event such as, for example, the expiration of a timer or the SDAx determines that it is better than an advertised ASDA for its subnet.

At state 630 an ASDA election algorithm is carried out wherein the SDAx issues an SDA_WILLING multicast message on the subnet and competes with other willing SDAs on the subnet for ASDA status. The election of an ASDA is made through a comparison of the willing SDAs operation status and properties. The election criteria include, for example, physical memory size, CPU speed, operating system version, and computation capacity. If the SDAx is not elected as the ASDA at state 630, then SDAx transitions from the election state 630 to the idle state 620. If the SDAx is selected as the ASDA, then SDAx transitions from election state 630 to an ASDA status declaration state 640.

At state 640 the SDAx issues an SDA_AD message thereby declaring its ASDA status. From state 640 the SDAx can transition to a shutdown state 650 wherein it notifies other interested network entities that it is shutting down, and upon completion of shutdown procedures passes to End state 660. Otherwise, the SDAx transitions from state 640 to the election state in response to an appropriate event, such as receiving an SDA_WILLING notification from a better SDA within the subnet.

Figure 6C:
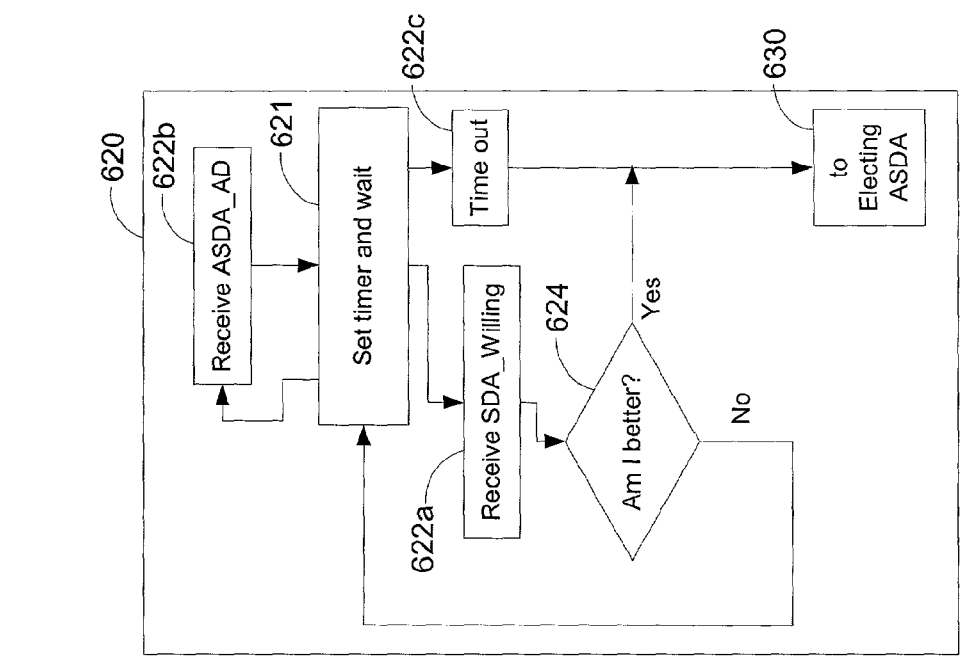
Figure 6B:
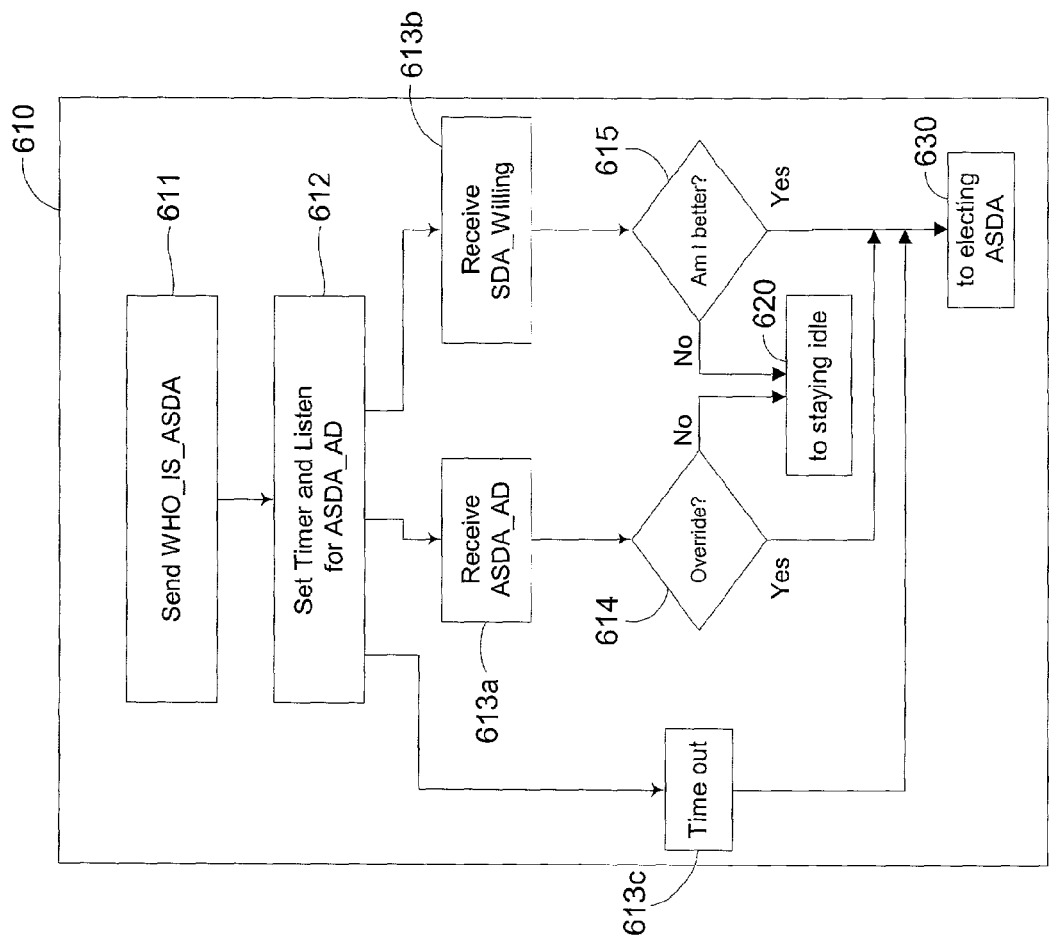

FIG. 6b details exemplary steps executed while the SDAx is in the ASDA detecting state 610 of FIG. 6a. The detection starts at step 611, wherein the SDAx multicasts a WHO_IS_ASDA message 501 in a subnet. At step 612, the SDAx sets a timer and waits for responses. If an ASDA_AD message 502 is received (step 613a) indicating that an ASDA exists in the subnet, then at step 614 the SDAx determines whether to override the existing ASDA. If SDAx does decide to override the current ASDA, then SDAx then enters the election state 630. If SDAx does not seek to override the current ASDA, then SDAx enters the idle state 620.

Alternatively, following step 612 the SDAx receives an SDA_WILLING message 503 is received at step 613b. The SDA_WILLING message indicates that another SDA intends to compete for ASDA status. Next, at step 615 the ASDx determines whether the SDA is better than the SDA that sent the received SDA_WILLING message. If the SDAx determines that it is better, then ASDx enters the election state 630. Otherwise if the SDAx is not better, then it enters the idle state 620.

The third option encountered from step 612 is that no ASDA_AD signal is received during the timeout period. In that case, the SDAx notes a timeout at step 613c and responds by entering the election state 630.

Referring to FIG. 6c, a set of exemplary steps are depicted that describe the operation of the SDAx while in the idle state 620. Starting at step 621, a timer is set and the procedure waits for an SDA_WILLING or ASDA_AD message from another SDA in the subnet. During the wait time interval, if an SDA_WILLING message is received at step 622a, then control passes to step 624 wherein the SDAx determines whether it is better than the SDA described in the SDA_WILLING message. If the SDAx is better, then the SDAx enters the election state 630. Otherwise, control returns from step 624 to step 621 wherein the SDAx resets its timer and waits.

Alternatively, if an ASDA_AD message is received at step 622b, then the SDAx merely resets the timer and continues to wait for a next message at step 621. Finally, the timer can time out without the SDAx receiving either of the two above-mentioned messages being received. The SDAx notes the timeout at step 622c and enters the election state 630.

Figure 6D:
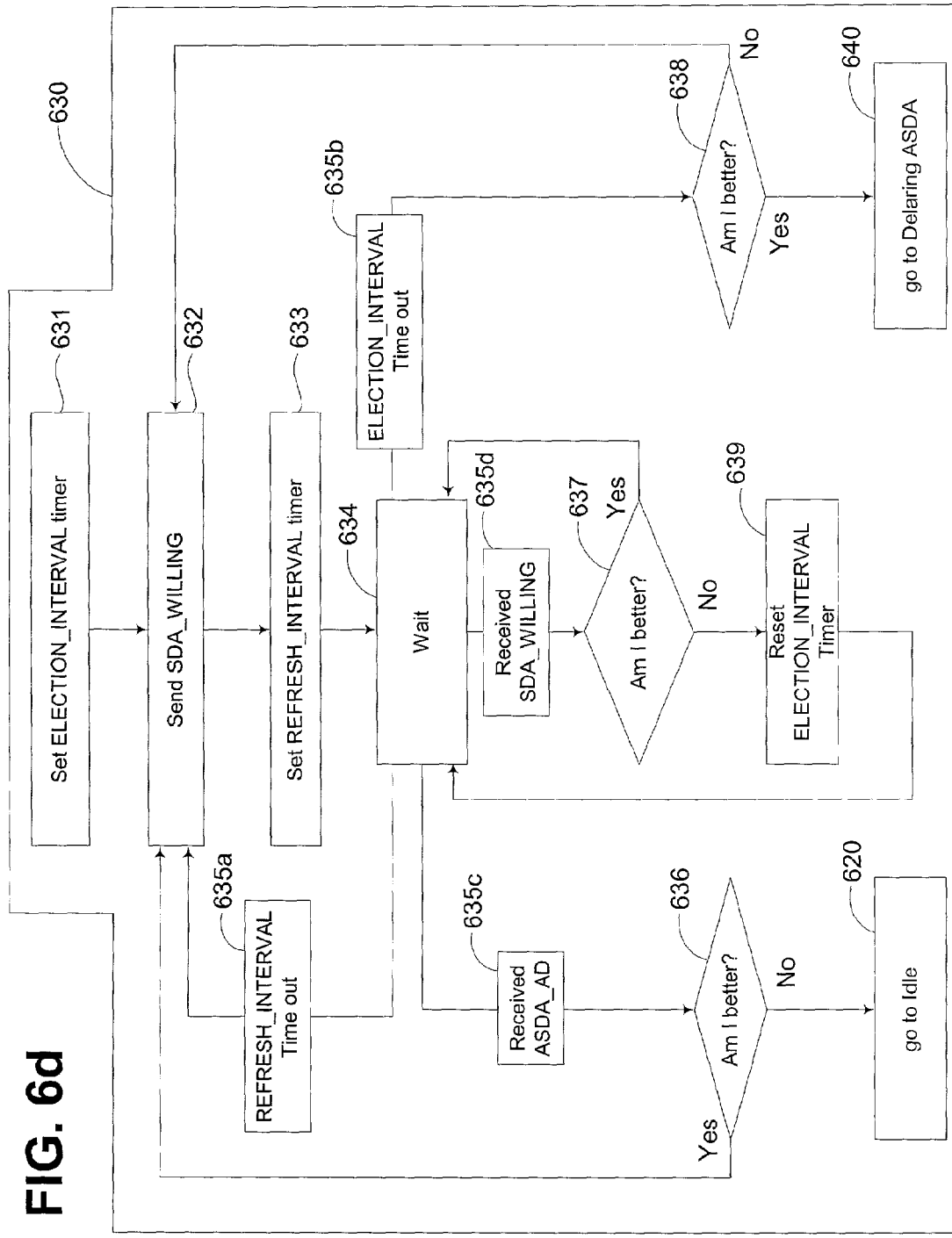

Referring to FIG. 6d, a set of exemplary steps are depicted for carrying out the election state 603 of SDAx. Starting at step 631, an ELECTION_INTERVAL timer is set with a time period that is preferably greater than dead time interval to ensure that all interested SDAs have an opportunity to issue an SDA_WILLING message. Next, at step 632, the SDAx multicasts an SDA_WILLING message to the subnet. At step 633, the SDAx sets a REFRESH_INTERVAL timer and then waits at step 634. The REFRESH_INTERVAL is preferably not longer than the ELECTION_INTERVAL timer period.

If no response received in the REFRESH_INTERVAL, the SDAx notes the timeout at step 635a and returns to step 632. If at step 634 the ELECTION_INTERVAL expires, then at step 635b the SDAx notes the timeout and control passes to step 638. At step 638 the SDAx determines whether it is the best candidate for ASDA status based upon the established election criteria. If the SDAx is the best candidate, then the SDAx enters the ASDA status declaration state 640. If the SDAx is not better than one of the other willing SDAs, then control passes to step 632.

Will waiting at step 634, if an ASDA_AD message is received at step 635c, then at step 636 the SDAx determines whether it is better than the SDA that sent the SDA_AD message. If the SDAx is indeed better, then control passes from step 636 back to step 632. Otherwise, the SDAx passes from step 636 to the idle state 620.

Finally, if while waiting at step 634, the SDAx receives an SDA_WILLING message at step 635d, then control passes to step 637. At step 637, the SDAx determines whether the SDAs is better than the SDA that sent the SDA_WILLING message. If the SDAx is indeed better, then control passes to step 634 (in effect disregarding the SDA that sent the SDA_WILLING message). If at step 637 the SDAx determines that it is not better than the sender of the SDA_WILLING message, then control passes to step 639. At step 639 the SDAx resets the ELECTION_INTERVAL timer and returns to wait step 634.

Figure 6F:
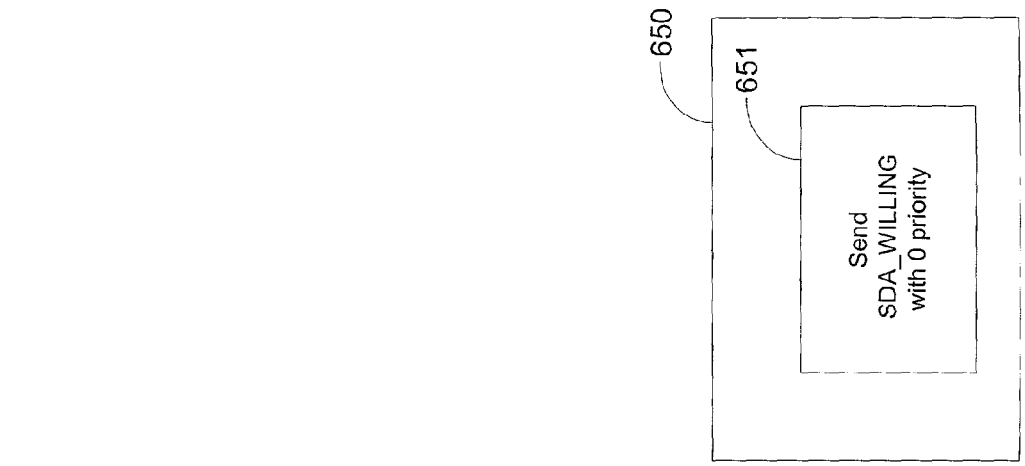
Figure 6E:
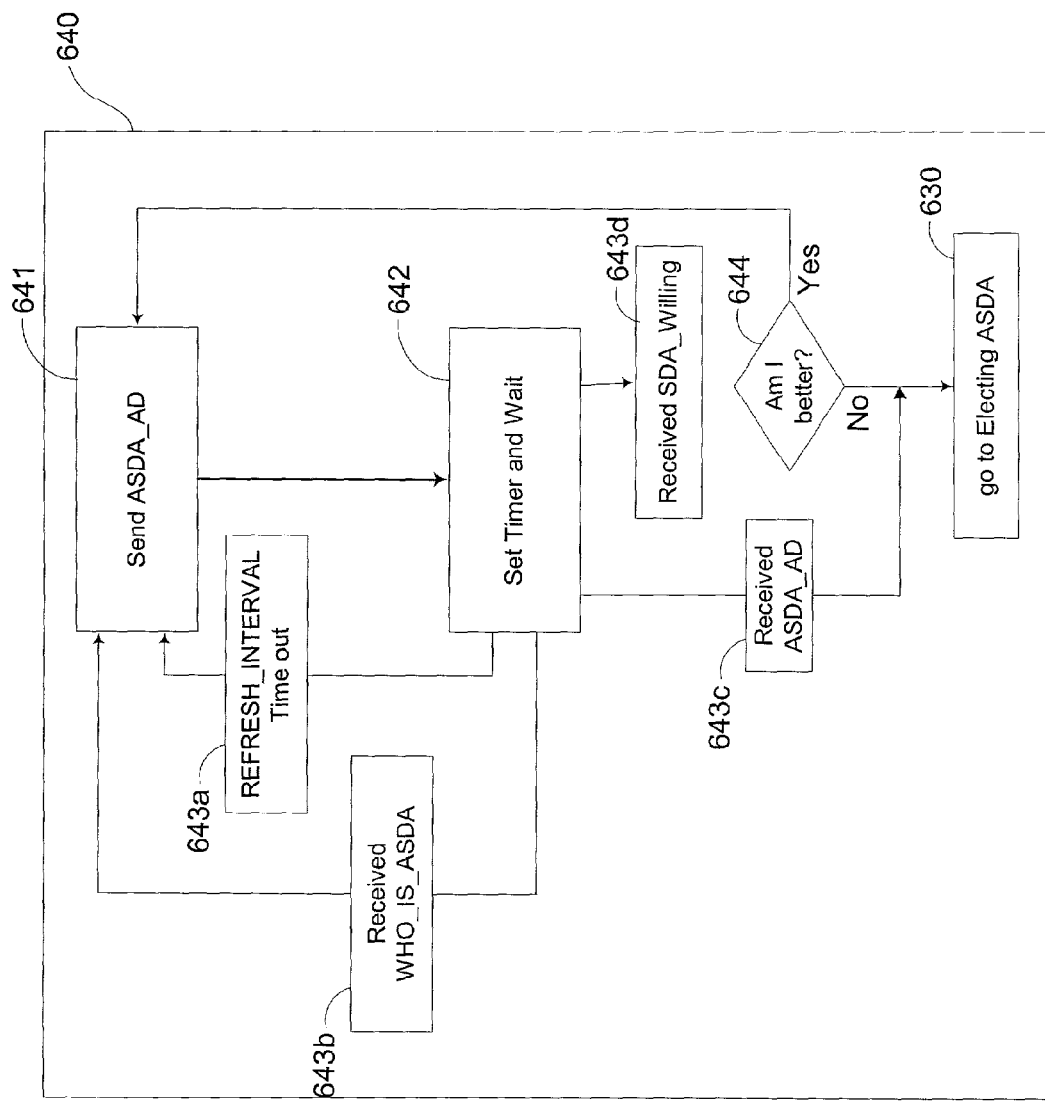

Referring to FIG. 6e, exemplary steps executed by the SDAx during the declaration state 640 are summarized. During step 641 the SDAx multicasts an ASDA_AD message in the subnet. Next, at step 642, the SDAx sets a timer and waits for responses to the advertisement message. If no response is received during the set interval, then the timer expiration is noted at step 643a and control returns to step 641. Also, if a WHO_IS_ASDA message is received at step 643b while the wait period is taking place at step 642, then control returns to step 641 and the SDAx re-issues its ASDA advertisement message.

However, if the SDAx receives an ASDA_AD message at step 643c while executing the wait period at step 642, then the SDAx enters the election state 630 described herein above. Finally, if the SDAx receives an SDA_WILLING message at step 643d while waiting at step 642, then control passes to step 644 wherein the SDAx determines whether it is better than the sender of the SDA_WILLING message. If the SDAx is indeed better, then control returns to step 641. Otherwise, if the SDAx is not better, then SDAx passes from the declaration state 640 to the election state 630.

Referring to FIG. 6f, the shutting down state 650 is summarized. The shutting down step comprises step 651 wherein the SDAx multicasts an SDA_WILLING message with zero (0) priority. This message invokes other SDAs in the subnet to either re-assert their ASDA status or enter an election state wherein one of the remaining SDAs will establish and advertise ASDA status.

Figure 7:
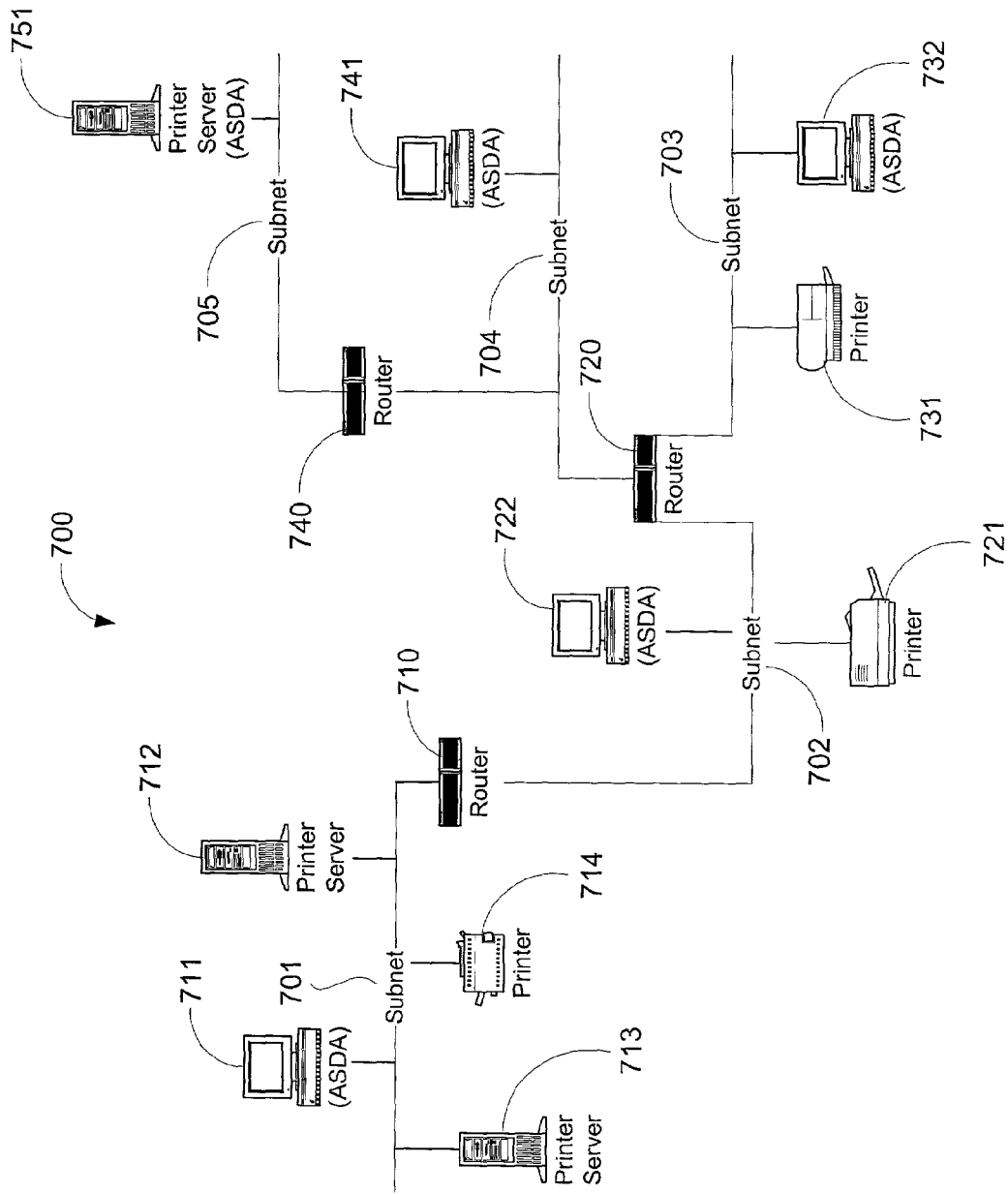
FIG. 7 illustrates an exemplary network having multiple subnets that can advantageously employ the invention.

Having described the general operation of a system embodying the present invention and exemplary states of SDAs in such a system, attention is directed to a particular exemplary embodiment of the present invention involving network printer discovery. With reference to FIG. 7, the distributed network 700 comprises subnet 701, subnet 702, subnet 703, subnet 704, and subnet 705. The subnets are linked by routers. In particular, router 710 connects subnet 701 to subnet 702. Router 720 connects subnet 702 to subnet 703 and subnet 704. Router 740 links subnet 704 to subnet 705. It is noted that the network 700 includes many networked user computers that are not depicted in order to simplify the drawing.

A number of ASDAs, printers and print servers are distributed throughout the network 700. Subnet 701 contains a printer server 712, a printer 714, a printer server 713, and an ASDA 711. Subnet 702 includes ASDA 722 and printer 721. Subnet 703 includes printer 731 and ASDA 732. Subnet 704 includes ASDA 741. Subnet 705 has printer server 751 that is also the ASDA for the subnet 705. For exemplary purposes, all the subnets have the same security properties and are in the same trusted domain.

In an embodiment of the invention, SDA software is executed upon multiple nodes within each subnet including the depicted network printers 714, 721, 731; printer servers 712, 713, and 751; and networked computers 711, 722, 732, and 741. In each subnet, an ASDA is selected from among the available SDAs according to the states and steps illustratively depicted, by way of example, in FIGS. 6a-6f or alternatively by manual selection by a network administrator. Each ASDA maintains a list of other ASDAs in neighboring subnets for purposes of propagating printer discovery requests throughout the network.

In an embodiment of the invention, a printer server in an originating subnet requests discovery of all printers throughout the network 700. Such discovery is initiated by the print server sending a device (printer) discovery request to the ASDA in its subnet. The recipient ASDA identifies its neighboring ASDAs in subnets adjacent to the originating subnet and forwards the request to the neighboring ASDAs. In response to the forwarded request, the ASDAs discover printers in their respective subnets, and if printers are present, then the ASDAs pass the discovery results to the requesting printer server. In addition to responding to the printer server the neighboring ASDAs propagate the discovery request to neighboring ASDAs in a discovery process that continues until the discovery request has propagated throughout the network.

There is a potential for an ASDA to receive multiple request messages, and execute multiple searches/responses, associated with a same initial device discovery request. However, an embodiment of the invention seeks to reduce such redundancy. By way of example, globally unique identifiers that accompany resource (e.g., device) discovery requests enable the ASDAs to recognize, and therefore ignore, redundant discovery requests for which the ASDAs have previously executed a search and issued (if appropriate) a response. Furthermore, in an embodiment of the invention, an ASDA does not propagate an identified discovery request to a neighboring ASDA from which it has previously received the identified discovery request. Each of these network traffic/redundancy controls is present in the example provided herein below wherein a printer server issues a network-wide printer discovery request.

FIG. 8 summarizes a set of actions taken by entities depicted in FIG. 7 in response to the printer server 712 requesting discovery of all printers in the network 700. At step 801, printer server 712 multicasts a WHO_IS ASDA message on subnet 701 for discovering the ASDA in subnet 701. In response, at step 802, ASDA 711 multicasts an ASDA_AD message in subnet 701. At step 803, printer server 712 unicasts a SEARCH_DEVICE message to ASDA 711 to begin the propagation of the printer resource discovery request throughout the network 700.

At step 804, ASDA 711 searches its list of printers on subnet 701 that results in discovery of printer 714. At step 805, ASDA 711 unicasts a FOUND_DEVICE message to printer server 712. The FOUND_DEVICE message comprises a parameter specifying the network location of printer 714. An exemplary parameter states: //subnet 701 address/ printer 714 address/.

The ASDA 711 next propagates the printer discovery request onto neighboring subnets. However, in an exemplary embodiment of the present invention, before the ASDA 711 requests identification of resources, it determines the neighboring ASDAs at step 806 by issuing a multicast WHO_IS_ASDA message on subnet 702, which is adjacent to subnet 701. In response, at step 807, ASDA 722 unicasts an ASDA_AD message to ASDA 711 claiming that it is the ASDA in subnet 702. At step 808, ASDA 711 propagates the SEARCH_DEVICE request, that originated from printer server 712, to ASDA 722, thereby requesting ASDA 722 to identify all printers on subnet 702 to the printer server 712. After initially determining that ASDA 722 has not previously responded to the uniquely identified discovery request, at step 809 the ASDA 722 searches its printer discovery databases for subnet 702. This search results in identification of printer 721. At step 810, the ASDA 722 unicasts a FOUND_DEVICE message to printer server 712. The message identifies the location of printer 721 in subnet 702 of the network.

As part of its network printer discovery request propagation function, at step 811 the ASDA 722 multicasts a WHO_IS_ASDA message to all neighboring subnets (e.g., subnet 701, subnet 703, and subnet 704) that are adjacent to subnet 702. In response, at step 812, ASDA 711, ASDA 732, and ASDA 741 separately unicast ASDA_AD messages to ASDA 722 claiming they are ASDAs for their respective subnets. At step 813, ASDA 2 forwards the SEARCH_DEVICE message to ASDA 732 and ASDA 741 for searching printers in their respective subnets. However, ASDA 722, recognizes the GUID of the request as corresponding to a prior request provided by the ASDA 711 and does not forward the message to ASDA 711. In an alternative embodiment, the ASDA 722 transmits the discovery request to all neighboring ASDAs regardless of whether the ASDA 722 previously received the identified request from one or more of the neighboring ASDAs.

As will be explained further herein below, it is possible for an ASDA to receive a discovery request that it has previously executed. There are a variety ways that an ASDA can respond to redundant discovery requests. In alternative embodiments of the invention, recipients of redundant requests (from two or more independent ASDAs) respond to the redundant requests by issuing a discovery response or ignoring the request altogether. In an embodiment of the invention, if an ASDA previously propagated a discovery request, then the ASDA does not propagate the request if received again.

In response to receiving the SEARCH_DEVICE message, at step 814 ASDA 732 and ASDA 741 search their subnet device lists for printers. At step 815, ASDA 732 unicasts a FOUND_DEVICE message to the printer server 712. The message sent by the ASDA 732 identifies the network location of the printer 731. In the illustrative embodiment of the invention, since there are no printers on the subnet 704 the ASDA 741 does not issue a response message to the printer server 712. Alternatively, the ASDA 741 issues a null response to the printer server 712 indicating that there are no discoverable printers on the subnet 704.

At step 816, ASDA 732 multicasts a WHO_IS_ASDA message to subnet 702 and subnet 704. At step 817, ASDA 722 and ASDA 741 unicast ASDA_AD messages to ASDA 732 claiming that they are the ASDAs in subnet 702 and subnet 704, respectively. At step 818, ASDA 732 utilizes the returned ASDA addresses from step 817 to unicast a SEARCH_DEVICE message to ASDA 741 requesting searching printers in subnet 704. ASDA 732, recognizes the GUID of the request as corresponding to a prior request provided by the ASDA 722 and does not forward the message to ASDA 722. At step 819, ASDA 741 further recognizes the GUID of the request from the ASDA 732 as one that it has previously executed and therefore does not search for available network printers on its subnet. Alternatively, the ASDA 741 searches for network printers, and finds none (see, step 814). Furthermore, in the alternative exemplary embodiment the ASDA 741 unicasts a FOUND_DEVICE message to the printer server 712 that indicates that there are no network printers on the subnet 704 (or no message at all).

In continuation of the request propagation, at step 820 the ASDA 741 multicasts a WHO_IS_ASDA message on subnet 702, subnet 703, and subnet 705. At step 821 ASDA 722, ASDA 732, and ASDA 751 unicast ASDA_AD messages to the ASDA 741 declaring their ASDA status. At step 822, ASDA 741 forwards the SEARCH_DEVICE message to ASDA 751 requesting identification of network printers on subnet 705. The ASDA_AD messages from ASDA 722 and ASDA 732 are noted, but the SEARCH_DEVICE message is not sent to those two ASDAs since they previously sent the identified printer discovery request to the ASDA 741. At step 823 ASDA 751 searches for discovered network printers on subnet 705. Since no printers are present on subnet 705, the ASDA 751 does not issue any response to the printer server 712.

During step 824, ASDA 751 multicasts a WHO_IS_ASDA request on subnet 704. In response, at step 825 the ASDA 741 unicasts an ASDA_AD message to the ASDA 751. Since ASDA 751 previously received the current printer discovery request from the ASDA 741, ASDA 751 does not propagate the printer discovery request.

Having described an exemplary network printer discovery method it is noted that the present invention contemplates a number of variations to the exemplary steps. Such modifications include the order of execution of the depicted steps. In addition to the potential for multiple request recipients to simultaneously propagate a resource (e.g., printer) discovery request over the network, a number of other variations to the depicted steps are contemplated in executing a network-wide search for resources (e.g., printers). It is not necessary for an ASDA to receive a search request before looking for devices or obtaining the addresses of neighboring ASDAs. Such discovery (including discovery of devices/resources on a subnet) can occur at any time. However, by waiting until receiving a request to discover neighboring ASDAs, an ASDA ensures that it will have proper neighboring ASDA addresses when it unicasts a discovery search request. Having particular designated ASDAs in subnets reduces the amount of communications generated when network-wide device discovery is invoked. Furthermore, the search request to neighboring nodes can alternatively comprise a multicast message—that is responded to only by the current ASDA on a receiving subnet. Whether an ASDA (1) sends a request to a previous sender of an identified discovery request, (2) responds to redundant requests, and (3) issues a response to a requester even when the requested device is not present on a subnet, are implementation choices altered in various embodiments of distributed device discovery methods and systems embodying the present invention.

It will be appreciated by those skilled in the art that a new and useful method and system for discovering networked resources in distributed networks have been described herein. In view of the many possible embodiments to which the principles of this invention may be applied, however, it should be recognized that the embodiments described herein with respect to the drawing figures are meant to be illustrative and should not be taken as limiting the scope of invention.

Those skilled in the art to which the present invention applies will recognize that the illustrated embodiments can be modified in arrangement and detail without departing from the spirit of the invention. For example, the invention is described as installing a SDA in multiple node types on a subnet. However, other configurations may also be employed. For example, a network printer may not have an SDA installed therein. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method for discovering network devices in a network having multiple subnets, the method comprising:
   automatically selecting, from a plurality of inter-subnet discovery agents each installed on a respective one of a plurality of computing nodes within a particular subnet of the multiple subnets, a one of the plurality of the inter-subnet discovery agents as an active inter-subnet discovery agent (ASDA) for the particular subnet, the selecting based on at least one of operating system versions, primary (physical) memory sizes, or central processing unit (CPU) speeds of the plurality of computing nodes within the particular subnet;
   discovering, by the ASDA of the particular subnet, ASDAs installed on a respective one of a plurality of computing nodes within neighboring subnets in the network, the discovering comprising:
      sending, by the ASDA for the particular subnet, a multicast request for information about the ASDAs on the one or more neighboring subnets neighboring the particular subnet;
      receiving, by the ASDA for the particular subnet, a unicast communication from each of the neighboring ASDAs on the one or more neighboring subnets, each unicast communication comprising a network address and an ASDA status of the respective neighboring ASDA that sent the unicast communication; and
      storing, by the ASDA for the particular subnet, information from each of the received unicast communications in a list comprising identities, network addresses, and ASDA status of the neighboring ASDAs;
   receiving, by the ASDA for the particular subnet, a network device discovery request from a resource discovery requester located on a different computing node within the particular subnet than the ASDA for the particular subnet, the network device discovery request requesting discovery information for a specified discoverable network device in the network;
   propagating, by the ASDA for the particular subnet in response to receiving the network device discovery request, an inter-subnet network device search request for discovery information for the specified discoverable network device, the inter-subnet network device search request propagated to each of the neighboring ASDAs on the one or more neighboring subnets neighboring the particular subnet as identified by searching the list, wherein each of the neighboring ASDAs receiving the inter-subnet network device search request in turn propagates the inter-subnet network device search request to ASDAs in subnets neighboring the one or more neighboring subnets neighboring the particular subnet and containing the neighboring ASDAs such that the request is propagated throughout the network; and
   receiving, by the resource discovery requester from the one or more of the neighboring ASDAs that received the inter-subnet network device search request, a response comprising the discovery information for the specified discoverable network device, wherein the in turn propagating is based on respective lists stored in each of the ASDAs of the respective subnets of the multiple subnets, each of the respective lists comprising identities, network addresses, and ASDA status of the neighboring ASDAs.

2. The method of claim 1, wherein the network device discovery request is a request to identify one or more printers in the network.

3. The method of claim 1, further comprising:
   receiving, by a computing node containing the ASDA for the particular subnet, a request from the resource discovery requester to provide discovery information for a discoverable network device;
   passing the request to the ASDA for the particular subnet;
   searching the list by the ASDA for the particular subnet; and
   issuing, by the computing node, a search request identifying the resource discovery requester to at least one neighboring ASDA included in the list.

4. The method of claim 3, further comprising:
   transmitting, by the computing node, to the resource discovery requester a response including resource discovery information corresponding to the discoverable network device.

5. The method of claim 1, further comprising:
   publishing, by one of the plurality of computing nodes, address information for one or more neighboring ASDAs into a network directory service.

6. The method of claim 5, wherein the network directory service comprises information from the respective lists stored in each of the ASDAs in the network.

7. The method of claim 1, wherein the computing node on which the ASDA for the particular subnet is located comprises a set of device discovery agents, and
   further comprising determining, by the set of device discovery agents, discovery information for discoverable network devices in the particular subnet.

8. A computer memory storing computer-executable instructions for performing the acts of:
   automatically selecting, from a plurality of inter-subnet discovery agents each installed on a respective one of a plurality of computing nodes within a particular subnet of the multiple subnets, a one of the plurality of the inter-subnet discovery agents as an active inter-subnet discovery agent (ASDA) for the particular subnet, the selecting based on at least one of operating system versions, primary (physical) memory sizes, or central processing unit (CPU) speeds of the plurality of computing nodes within the particular subnet;

discovering, by the ASDA of the particular subnet, ASDAs installed on a respective one of a plurality of computing nodes within neighboring subnets in the network, the discovering comprising:

sending, by the ASDA for the particular subnet, a multicast request for information about the ASDAs on the one or more neighboring subnets neighboring the particular subnet;

receiving, by the ASDA for the particular subnet, a unicast communication from each of the neighboring ASDAs on the one or more neighboring subnets, each unicast communication comprising a network address and an ASDA status of the respective neighboring ASDA that sent the unicast communication; and storing, by the ASDA for the particular subnet, information from each of the received unicast communications in a list comprising identities, network addresses, and ASDA status of the neighboring ASDAs;

receiving, by the ASDA for the particular subnet, a network device discovery request from a resource discovery requester located on a different computing node within the particular subnet than the ASDA for the particular subnet, the network device discovery request requesting discovery information for a specified discoverable network device in the network;

propagating, by the ASDA for the particular subnet in response to receiving the network device discovery request, an inter-subnet network device search request for discovery information for the specified discoverable network device, the inter-subnet network device search request propagated to each of the neighboring ASDAs on the one or more neighboring subnets neighboring the particular subnet as identified by searching the list, wherein each of the neighboring ASDAs receiving the inter-subnet network device search request in turn propagates the inter-subnet network device search request to ASDAs in subnets neighboring the one or more neighboring subnets neighboring the particular subnet and containing the neighboring ASDAs such that the request is propagated throughout the network; and receiving, by the resource discovery requester from the one or more of the neighboring ASDAs that received the inter-subnet network device search request, a response comprising the discovery information for the specified discoverable network device, wherein the in turn propagating is based on respective lists stored in each of the ASDAs of the respective subnets of the multiple subnets, each of the respective lists comprising identities, network addresses, and ASDA status of the neighboring ASDAs.

9. The computer memory of claim 8, wherein the network device discovery request is a request to identify one or more printers in the network.

10. The computer memory of claim 8, wherein the acts further comprise:

publishing, by one of the plurality of computing nodes, address information for one or more neighboring ASDAs into a network directory service.

11. The computer memory of claim 10, wherein the network directory service comprises information from the respective lists stored in each of the ASDAs in the network.

12. The computer memory of claim 8, wherein the acts further comprise:

determining, by the plurality of inter-subnet discovery agents, discovery information for one or more discoverable network devices present on the subnet.

13. The computer memory of claim 8, wherein the computing node on which the ASDA for the particular subnet is located comprises a set of device discovery agents, and further comprising determining, by the set of device discovery agents, discovery information for discoverable network devices present on the particular subnet.

14. A system for automating network-wide resource discovery in a network having multiple subnets, the system comprising:

a particular subnet comprising:

a plurality of computing nodes having installed thereon local discovery agents configured to implement network device discovery requests within the particular subnet according to a local discovery protocol;

a resource discovery requester located on one of the plurality of computing nodes; and an active inter-subnet discovery agent (ASDA) located on a different one of the plurality of computing nodes in the particular subnet than the resource discovery requester, the ASDA automatically selected from the local discovery agents based on at least one of operating system versions, primary (physical) memory sizes, or central processing unit (CPU) speeds of the respective plurality of computing nodes on which the local discovery agents are installed, wherein the ASDA is configured to:

create a list by sending a multicast request for information about neighboring ASDAs installed on a respective one of a plurality of computing nodes within each of the on neighboring subnets neighboring the particular subnet and receiving unicast responses from each of the neighboring ASDAs including a network address and an ASDA status of the respective neighboring ASDAs, wherein the list stores identities, network addresses, and ASDA status of each of the neighboring ASDAs;

receive, from the resource discovery requester, a network device discovery request requesting discovery information for a specified discoverable network device in the network; and responsive to receiving the network device discovery request, propagate an inter-subnet network device search request for discovery information for the specified discoverable network device, the inter-subnet network device search request propagated to each of the neighboring ASDAs on the one or more neighboring subnets neighboring the particular subnet as identified by searching the list, wherein each of the neighboring ASDAs receiving the inter-subnet network device search request in turn propagates the inter-subnet network device search request to ASDAs in subnets neighboring the one or more neighboring subnets neighboring the particular subnet and containing the neighboring ASDA such that the request is propagated throughout the network, the in turn propagating is forwarding based on respective lists stored in each of the ASDAs of the respective subnets of the multiple subnets, each of the respective lists comprising identities, network addresses, and ASDA statuses of the neighboring ASDAs; and wherein the resource discovery requester is configured to receive a response comprising the discovery information for the specified discoverable network device from the one or more of the neighboring ASDAs that received the inter-subnet network device search request.

15. The system of claim 14, wherein the network device discovery request is a request to identify printers in the network.

16. The system of claim 14, wherein a one or more of the plurality of computing nodes is configured to publish address information for neighboring ASDAs into a network directory service.

17. The system of claim 16, wherein the network directory service comprises information from the respective lists stored in each of the ASDAs.

18. The system of claim 14, wherein the one of the plurality of computing nodes on which the ASDA is located comprises a set of device discovery agents, and the set of device discovery agents are configured to determine discovery information for discoverable network devices present on the particular subnet.

19. The system of claim 14, wherein the local discovery protocol comprises one of universal plug and play (UPnP) or simple-location-protocol (SLP).

20. The system of claim 14, wherein the network discovery protocol comprises transmission control protocol/Internet protocol (TCP/IP).

* * * * *